United States Patent Office 2,727,403
Patented Dec. 20, 1955

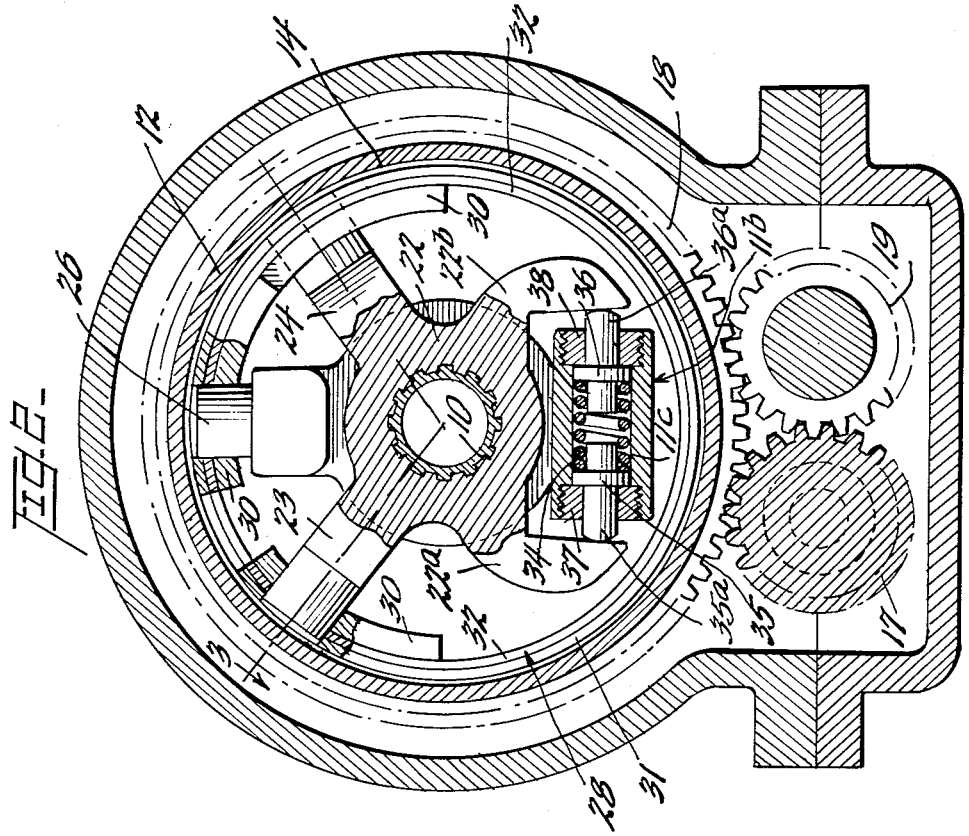
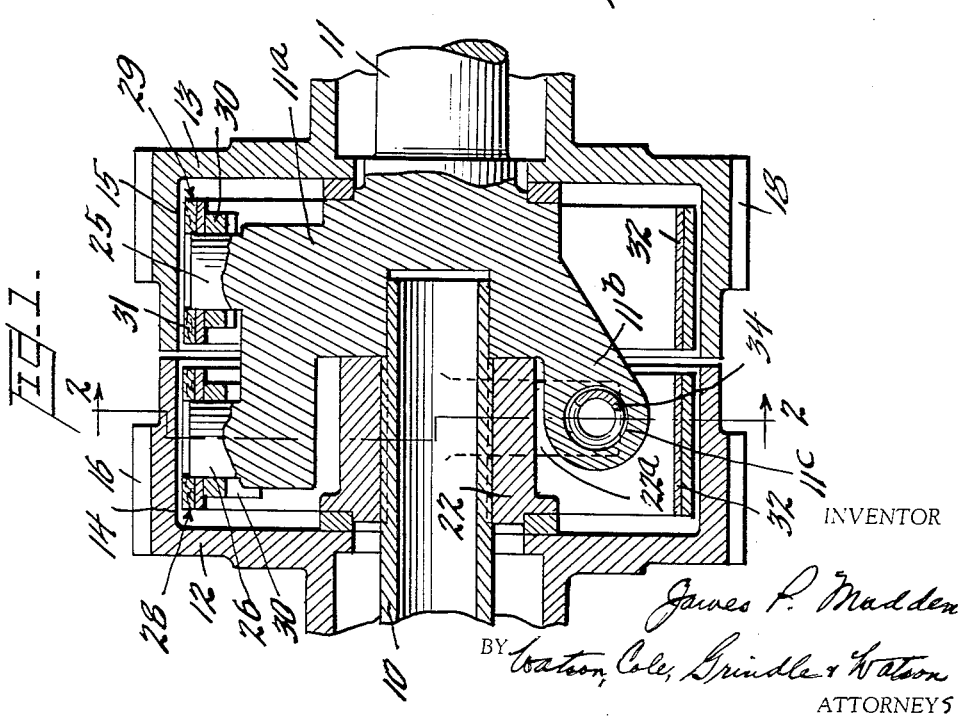

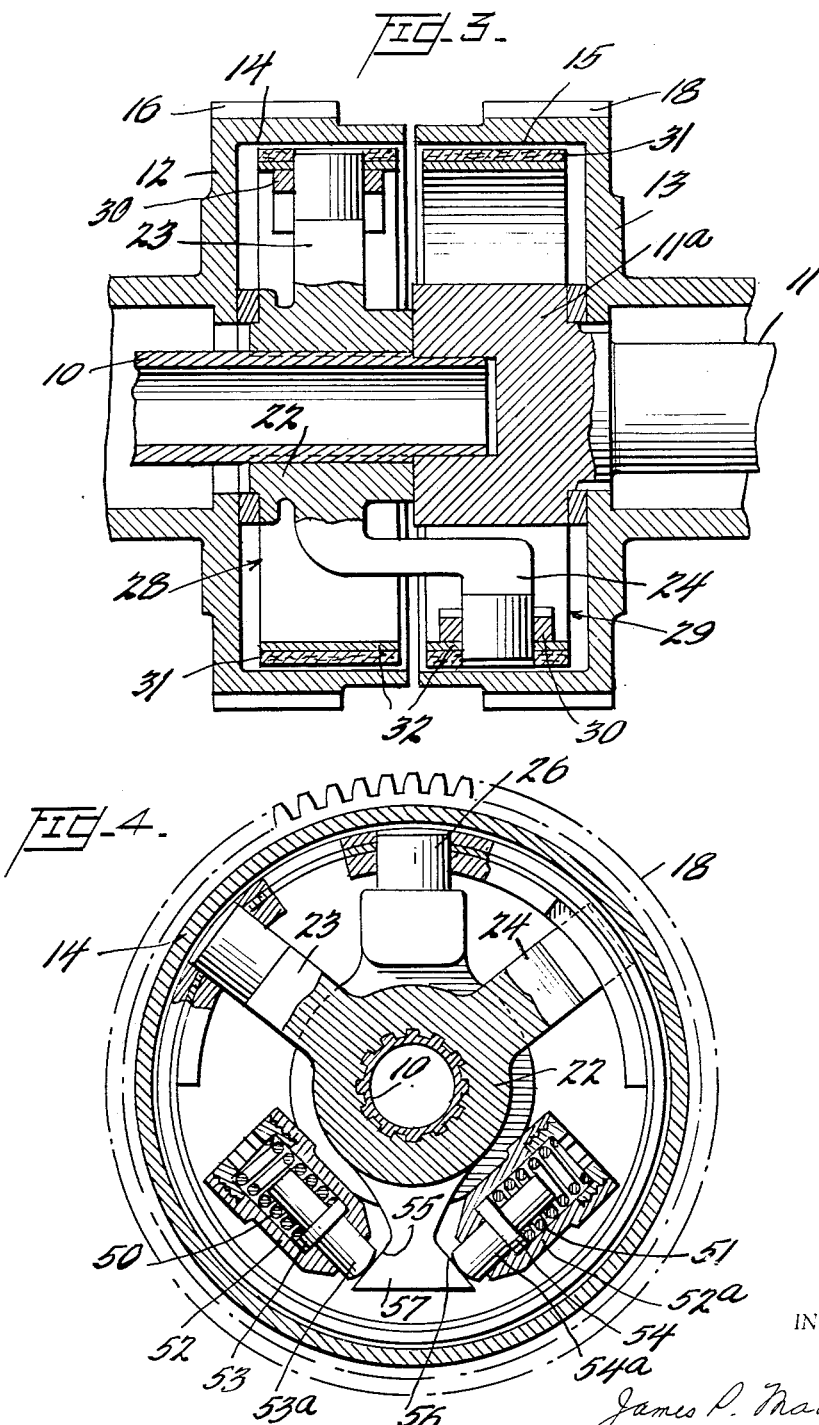

2,727,403

SERVO MECHANISM

James P. Madden, Bethlehem, Pa.

Application October 14, 1952, Serial No. 314,717

3 Claims. (Cl. 74—388)

The present invention relates to mechanisms for the application of manually and mechanically developed forces to members to be actuated in the performance of useful work, and relates particularly to a mechanism of this character by means of which a rotatable work shaft may be operated either manually, when the resistance to rotation is small, or by a combination of manually and mechanically developed forces when such resistance exceeds a predetermined minimum, the syntactic relationship between the manually operated member and the work shaft being maintained at all times.

In Patent 1,751,647 issued March 25, 1930 to Henry W. Nieman there is disclosed a servo-mechanism adapted to be employed in a case where it is desired to actuate a driven member by power but in such manner that it shall occupy at all times a position which corresponds to the position of a control element which may be moved manually or by an automatically acting device of selected character. That servo-mechanism has operated with great effectiveness in the performance of various tasks. The operation of the work performing shaft of that mechanism, however, is brought about substantially entirely by power taken from a power source, any power applied manually to the control element serving only to establish a connection between the power source and the member to be driven.

The present invention comprises an improvement upon the servo-mechanism which comprises the subject matter of the patent identified in that it provides for the manual operation of the work performing shaft so long as its manual operation may be conveniently accomplished, that is, until the resistance to movement of the shaft becomes greater than a predetermined amount, whereupon a connection to the power source is automatically established and further operation of the work shaft is accomplished by a combination of manually and mechanically developed forces. The mechanism may be employed with great advantage in the operation of equipment in which it is highly to be desired that the operator may "feel" at all times the amount of resistance which the work offers to the movement of the work performing shaft or member. In the steering of vehicles and boats with the aid of power it is particularly desirable to provide the operator with means by which steering functions may be easily accomplished with the aid of power but which enables him to "feel" the amount of resistance offered to movement of the steering wheels or rudder and the present invention is particularly useful when incorporated in a steering mechanism although it has, of course, many other uses. Most servo-mechanisms employed heretofore are so constructed that the operator can feel only the resistance to movement which may be offered by a valve or other rather small or light control element which in turn releases power from a suitable source in sufficient quantity to accomplish the work to be done, the operator being unaware of the amount of work being done or the magnitude of the force necessary to operate the driven equipment. When a device embodying the present invention is employed the operator has at all times the "feel" of the work being accomplished, initially and during the period of wholly manual operation to the fullest extent and, when both manual and mechanical power are being utilized, to only slightly decreased degree.

The invention may be embodied in various forms of apparatus designed for the accomplishment of different tasks and, in the accompanying drawings, two such embodiments are illustrated.

In the drawings:

Figure 1 is a longitudinal section through a preferred form of the mechanism, taken along the common axis of the control and work shafts;

Figure 2 is a section on line 2—2 of Figure 1, a casing or housing being shown in this view which has been omitted in Figure 1;

Figure 3 is a section on line 3—3 of Figure 2; and

Figure 4 is a section, generally similar to the sectional view Figure 2, through a modified form of device.

In the form of the invention illustrated in Figures 1, 2 and 3 the coaxially arranged control and work shafts are indicated at 10 and 11, respectively, these being suitably supported for free rotation in suitable bearings, not illustrated, and the end of the control element being received and supported for rotation with a cylindrical recess formed in the enlarged end portion of work shaft 11. Drums 12 and 13, having inwardly facing cylindrical friction faces 14 and 15, are also supported for rotation about the common axis of the control and work shafts by suitable bearing means of conventional character and which is not illustrated. Each of these drums is externally toothed, the teeth 16 of drum 12 meshing with those of a pinion 17 and the teeth 18 of drum 13 meshing with those of a pinion 19, these pinions, and hence the drums 12 and 13, being driven in opposite directions by a motor or other suitable source of power, not illustrated, preferably at uniform angular velocity.

Fixed upon control shaft 10 is a hub 22 from which project arms 23 and 24, hereafter designated control arms, and from the enlarged end portion 11a of the work shaft 11 project two arms 25 and 26, hereafter designated work arms. The outer or terminal ends of these arms are preferably cylindrical and snugly fit within apertures formed for their reception in the ends of friction bands generally indicated at 28 and 29, respectively, the ends of these bands being reinforced by the attachment of relatively thick curved metallic plates 30, which are of identical character.

Each such band comprises a friction facing 31 and a metallic backing strip 32 and is supported at its ends only, its control end being mounted upon a control arm of the control member and its power delivery end upon a work arm of the work member, arms 23 and 26 supporting band 28 and arms 24 and 25 supporting band 29, arm 24 being substantially Z-shaped so that its terminal end may reach and engage and support band 29. From their work delivery ends, which are mounted upon work arms 25 and 26 respectively, the two bands extend in opposite directions around the axis of the drums, their control ends, mounted upon the angularly spaced control arms 23 and 24, being spaced somewhat from the work delivery ends, respectively.

Means to be described normally maintains the control and work shafts 10 and 11, and the control and work arms mounted on these shafts, in a definite angular relationship, in which they are illustrated in the drawings and, with these parts in the positions in which they are thus shown, each friction band is out of contact with the friction surface of the drum which encircles it throughout its entire length. The gap or space between the mutually facing cylindrical surfaces of band and drum, in the apparatus shown, is preferably about one one-hundredth inch (.01") neither band being active under these conditions. Rotation of the control shaft relatively to the work shaft, from the "normal" relative positions of these shafts, will cause one or the other of the bands to expand and to frictionally engage the encircling drum, as will be apparent.

The means for maintaining shafts 10 and 11 in a predetermined or "normal" angular relationship may be observed in Figures 1 and 2. The enlargement 11a of the work shaft 11 has projecting therefrom in a generally radial direction an arm 11b which terminates within the drum 12. This terminal portion is cylindrically apertured at 11c to receive the helical compression spring 34, confined between the enlarged inner ends of abutment members 35 and 36 slidable longitudinally of aperture 11c but normally pressed by the intermediate spring against the annular closure plugs 37 and 38 respectively, which are centrally apertured for the reception of the reduced axially extending portions 35a and 36a of the slidable spring-pressed abutment members. The parallel inner mutually facing surfaces of arms 22a and 22b of the hub 22 mounted upon the control shaft 10 normally engage the tips of the outwardly extending portions of the abutment members 35 and 36.

Spring 34, being under compression, maintains the slidable spring abutments at the outer ends of their paths of travel and thus the coaxial shafts 10 and 11 in a fixed angular relationship to each other. If the work shaft meets with no resistance this normal relationship will be maintained and the control and work shafts will turn as one. The same is true if the load imposed upon the work shaft is less than that required to bring about compression of the spring 34, and relative movement of the control and work shafts will occur only when the spring 34 yields so that, by choosing a spring of desired strength, and preferably pre-stressing or pre-loading it by longitudinally confining it within a space (between elements 35 and 36) shorter than the free length of the spring, relative movement of the coaxial control and work shaft will occur only when rotation of the work shaft is opposed by a greater than a definite or predetermined retarding force.

Thus a spring may be chosen which will not yield until the torque load upon the work shaft equals or exceeds two foot-pounds and, when so arranged, the device is well suited for use in the steering of vehicles or boats since the connection between the control shaft and steering means is direct and the power driven drums will idly rotate. Should the torque load upon the work shaft, however, exceed two foot-pounds the spring 34 will yield, allowing the control shaft to rotate relatively to the work shaft and thus bring one or the other of the friction bands into contact with the encircling drum, depending upon the direction of rotation of the shaft 10. The manually applied power will then be supplemented by the power taken from the mechanically driven drum and the work shaft will be rotated by manually and mechanically applied power. Normally the casing of the apparatus will be filled with a lubricant and, when this is the case, the power amplification will be about three to one so that the torque necessary to turn the control element will be two foot-pounds plus one-third of any additional, power-supplied torque which is required for the turning of the work shaft.

The friction faces of the friction elements or bands will wear very slowly but, even if entirely worn out, will not cause the mechanism to become inoperative for manual operation. Thus the mechanism is so designed, particularly the lengths of the reduced axial extensions 35a and 36a of spring abutments 35 and 36, that when the friction faces of the bands are entirely worn out, the members 22a and 22b will, when heavy torques are applied to the steering column or control shaft, alternately compress the spring 34 and come into contact with rigid extension 11b of the work shaft extension 11a, thus ensuring that the ability to manually steer is never lost. However, in the usual case, a vehicle steering mechanism so designed will outlast any vehicle with which it may be used.

Various modifications of the mechanism may be devised, such as that shown in Figure 4. In that figure two springs 50 and 51 are employed, these being contained in cylindrical recesses in members 52 and 52a respectively, rigidly attached to the enlargement 11a of the work shaft. Each spring resists movement of a single spring-pressed abutment member, these being indicated at 53 and 54 respectively, and the reduced extensions 53a and 54a of these abutments being normally in contact with the faces 55 and 56 respectively, of a projection 57 from the control shaft hub 22. This arrangement may be preferred under some circumstances, and others may be originated to meet varying conditions, the mode of operation of all, however, remaining the same.

Having thus described the invention, what is claimed as new and desired to be secured by Letters Patent is:

1. A mechanism of the class described comprising, in combination, two cylindrical drums adapted to be rotated in opposite directions, a friction band associated with each drum, coaxial control and work shafts having arms upon which the ends of said bands are respectively mounted, the control end of each band being mounted upon an arm of the control shaft and the work delivery end of each band upon an arm of the work shaft, both bands being closely associated but out of contact with the respective drums when the control shaft occupies a predetermined position with respect to the work shaft, and means opposing relative rotation of said shafts, said means permitting such relative motion only when the resistance of the work shaft to rotation exceeds a predetermined amount, one of said friction bands being brought into operative engagement with the associated power driven drum when relative motion occurs, to transmit power from said drum to said work shaft, said means including spaced arms rigid with one of said shafts, an intermediate arm rigid with the other shaft, and spring means normally maintaining said intermediate arm midway between said spaced arms.

2. A mechanism of the class described comprising, in combination, two cylindrical drums adapted to be rotated in opposite directions, a friction band associated with each drum, coaxial control and work shafts having arms upon which the ends of said bands are respectively mounted, the control end of each band being mounted upon an arm of the control shaft and the work delivery end of each band upon an arm of the work shaft, both bands being closely associated but out of contact with the respective drums when the control shaft occupies a predetermined position with respect to the work shaft, and means opposing relative rotation of said shafts, said means permitting such relative motion only when the resistance of the work shaft to rotation exceeds a predetermined amount, one of said friction bands being brought into operative engagement with the associated power driven drum when relative motion occurs, to transmit power from said drum to said work shaft, said means including spaced arms rigid with one of said shafts, a spring housing rigid with the other shaft and disposed intermediate said arms, members slidably mounted in the ends of the housing and engaging said arms, respectively, and a pre-loaded spring within the housing and normally urging said members in opposite directions and into engagement, respectively, with said arms.

3. A mechanism of the class described comprising, in combination, two cylindrical drums adapted to be rotated in opposite directions, a friction band associated with each drum, coaxial control and work shafts having arms upon which the ends of said bands are respectively mounted, the control end of each band being mounted upon an arm of the control shaft and the work delivery end of each band upon an arm of the work shaft, both bands being closely associated but out of contact with the respective drums when the control shaft occupies a predetermined position with respect to the work shaft, and means opposing relative rotation of said shafts, said means permitting such relative motion only when the resistance of the work shaft to rotation exceeds a predetermined amount, one of said friction bands being brought into operative engagement with the associated power driven drum when relative motion occurs, to transmit power from said drum to said work shaft, said means including spaced arms rigid with one of said shafts, an intermediate arm rigid with the other shaft, and a preloaded spring mounted on each of said spaced arms and normally maintaining said intermediate arm midway between said spaced arms.

References Cited in the file of this patent

UNITED STATES PATENTS

| | | |
|---|---|---|
| 1,958,894 | Knape | May 15, 1934 |
| 1,974,871 | Lansing | Sept. 25, 1934 |
| 2,311,010 | Vickers | Feb. 16, 1943 |
| 2,553,795 | Staude | May 22, 1951 |
| 2,587,377 | Penrose | Feb. 26, 1952 |

FOREIGN PATENTS

| | | |
|---|---|---|
| 883,699 | France | Mar. 29, 1943 |